(12) United States Patent
Nakayama et al.

(10) Patent No.: US 11,769,157 B2
(45) Date of Patent: Sep. 26, 2023

(54) CONTAINER PRODUCTION MANAGEMENT SYSTEM AND METHOD

(71) Applicant: TOYO SEIKAN CO., LTD., Tokyo (JP)

(72) Inventors: Kazuhiko Nakayama, Yokohama (JP); Takayuki Tochigi, Yokohama (JP); Shinobu Miura, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 668 days.

(21) Appl. No.: 16/643,777

(22) PCT Filed: Jun. 13, 2018

(86) PCT No.: PCT/JP2018/022602
§ 371 (c)(1),
(2) Date: Mar. 2, 2020

(87) PCT Pub. No.: WO2019/049454
PCT Pub. Date: Mar. 14, 2019

(65) Prior Publication Data
US 2020/0219112 A1    Jul. 9, 2020

(30) Foreign Application Priority Data

Sep. 7, 2017   (JP) ................................ 2017-172313

(51) Int. Cl.
*G06Q 30/018* (2023.01)
*B65B 5/02* (2006.01)
(Continued)

(52) U.S. Cl.
CPC ............. *G06Q 30/018* (2013.01); *B65B 5/02* (2013.01); *B65B 57/10* (2013.01);
(Continued)

(58) Field of Classification Search
CPC .. G06Q 30/018; G06Q 50/04; G05B 19/4183; G05B 19/418;
(Continued)

(56) References Cited

U.S. PATENT DOCUMENTS

2003/0015507 A1   1/2003  Miller et al.
2005/0194705 A1*  9/2005  Smith ..................... B29B 7/002
                                                    264/40.5
(Continued)

FOREIGN PATENT DOCUMENTS

CN           101043956 A    9/2007
CN           101273311 A    9/2008
(Continued)

OTHER PUBLICATIONS

Coles et al., Food Packaging Technology, 2003, Blackwell Publishing Ltd, 362 pp. (Year: 2003).*
(Continued)

*Primary Examiner* — Toan M Le
(74) *Attorney, Agent, or Firm* — Sughrue Mion, PLLC

(57) ABSTRACT

A container production management system including: an adding device (1) which adds object identification code (D) indicating an object identifier (ID); a processing process reader (2a,2b) which reads the object identifier indicated by the object identification code (D) added to the objects to be processed; an inspection process reader (3) which reads the object code (D) added to the object to be inspected in an inspection process; and a computing unit (4) which creates a database (5) in which the object identifier (ID), information on at least one processing process, and inspection results in the inspection process are linked with each other, wherein the adding device (1) adds the object identification code (D) to the material member for each container, or to a portion to be the material member among raw materials (S)

(Continued)

before the individual material member is separated therefrom.

18 Claims, 11 Drawing Sheets

(51) Int. Cl.
   *B65B 57/10* (2006.01)
   *G05B 19/418* (2006.01)
   *G06Q 50/04* (2012.01)
(52) U.S. Cl.
   CPC ......... *G05B 19/4183* (2013.01); *G06Q 50/04* (2013.01); *G05B 2219/31304* (2013.01)
(58) Field of Classification Search
   CPC . G05B 2219/31304; B65B 5/02; B65B 57/10; B65B 57/00; B65G 61/00; Y02P 90/02
   See application file for complete search history.

(56) References Cited

U.S. PATENT DOCUMENTS

| | | |
|---|---|---|
| 2009/0081819 A1 | 3/2009 | Okayasu et al. |
| 2014/0284380 A1 | 9/2014 | Toedtli |

FOREIGN PATENT DOCUMENTS

| | | |
|---|---|---|
| CN | 107122936 A | 9/2017 |
| JP | 8-175005 A | 7/1996 |
| JP | 11-124142 A | 5/1999 |
| JP | 11-319681 A | 11/1999 |
| JP | 2002-287813 A | 10/2002 |
| JP | 2008-516863 A | 5/2008 |
| JP | 2008-183613 A | 8/2008 |
| JP | 2010-168114 A | 8/2010 |
| JP | 2011-16546 A | 1/2011 |
| JP | 4759099 B1 | 8/2011 |
| JP | 2012-171636 A | 9/2012 |
| JP | 2012-221356 A | 11/2012 |
| JP | 2013-1431 A | 1/2013 |
| JP | 2013-75712 A | 4/2013 |
| JP | 2015-533332 A | 11/2015 |
| WO | 2006/044104 A1 | 4/2006 |
| WO | 2014/074165 A1 | 5/2014 |

OTHER PUBLICATIONS

Communication dated Apr. 6, 2021, from the European Patent Office in application No. 18852946.5.
International Search Report for PCT/JP2018/022602 dated Aug. 14, 2018.
International Preliminary Report on Patentability with Translation of Written Opinion of the International Searching Authority for PCT/JP2018/022602 dated Mar. 10, 2020.
Office Action dated Mar. 8, 2022 in corresponding Japanese Application No. 2021-072850.
Office Action dated Aug. 16, 2022 issued by the Japanese Patent Office in corresponding Japanese Application No. 2017-172313.
Office Action dated Aug. 23, 2022 issued by the Japanese Patent Office in corresponding Japanese Application No. 2021-072850.
Office Action dated Dec. 8, 2022 from the China National Intellectual Property Office in CN Application No. 201880057735.4.

* cited by examiner

CONTAINER PRODUCTION MANAGEMENT SYSTEM AND METHOD

CROSS REFERENCE TO RELATED APPLICATIONS

This application is a National Stage of International Application No. PCT/JP2018/022602 filed Jun. 13, 2018, claiming priority based on Japanese Patent Application No. 2017-172313 filed Sep. 7, 2017.

TECHNICAL FIELD

The present invention relates to a container production management system and method, more specifically, to a container production management system and method, in which a container can be specifically identified to manage a production process in the production process of the container.

BACKGROUND ART

Patent Document 1 describes one example of a conventional container production management system. According to Patent Document 1, a specific symbol is added to each of resin containers for beverage bottles, thereby connecting each pocket of a rotary conveying device for conveying a resin container to a resin container specific symbol held by each pocket to manage conveyance history information for each resin container.

This production management system is premised on connective rotary conveyance facilities in which the resin container is transferred between the rotary conveying devices adjacent to each other to perform connective conveyance, and therefore a conveyance order of the resin containers is fixed. Thus, even when the specific symbol is printed in the vicinity of an inspection device for a molded bottle, a resin container before printing can be linked with the pocket of the rotary conveying device by tracing back a conveyance route back from a printing stage.

RELATED ART DOCUMENTS

Patent Documents

Patent Document 1: JP-A-2013-75712

SUMMARY OF THE INVENTION

Problems to be Solved by the Invention

However, in the production management system described in Patent Document 1, it is difficult to link a specific symbol with each resin container before printing the specific symbol in a process before conveyance by connective rotary conveyance facilities. Therefore, it has been difficult to manage each preform, which is a material member of the resin container, with the specific symbol in a process before conveyance.

Moreover, in conveyance facilities other than the connective rotary conveyance facilities, a conveyance order of the resin containers is changed in several cases, and therefore it has been difficult to link an object symbol with a pocket of a rotary conveying device by tracing back to a stage before printing the specific symbol.

Further, also in a production fine in which a lane is branched and branched lanes are merged in order to improve throughput of production of the resin container, an order of containers is changed in several cases, and therefore it has been difficult to link the specific symbol with the pocket of the rotary conveying device by tracing back the specific symbol and the pocket.

The present invention has been made in view of the circumstances as described above, and an objective of the present invention is to provide a container production management system and method, in which a container production process capable of specifically managing each object ranging from a material member to a container, irrespective of a conveyance order of the object.

Means for Solving the Problems

In order to achieve the objective described above, the present invention relates to a container production management system for managing a container production process, comprising: an object identification code adding means for adding an object identification code indicating an object identifier, which is information for identifying an object ranging from a material member for each container to the container, to each of the objects; a processing step reading means for reading the object identifier indicated by the object identification code added to each of the objects to be processed in at least one processing step of processing the object added with the object identification code; an inspection step reading means for reading the object identifier indicated by the object Identification code added to each of the objects to be inspected in at least one inspection step of inspecting the object added with the object identification code; and a computing means for creating a database in which the object identifier indicated by the object identification code, information on at least one processing step, and inspection results in at least one inspection step are linked with each other, wherein the object identification code adding means adds the object identification code to the material member for each container; or to a portion to be the material member among raw materials before an individual material member is separated therefrom.

Moreover, the present invention relates to a container production management method, which is container production management system for managing a container production process, comprising: a step of adding an object identification code indicating an object identifier, which is information for identifying an object ranging from a material member for each container to the container; a step of reading the object identifier indicated by the object identification code added to each of the objects to be processed in at least one processing step of processing the object-added with the object identification code; a step of reading the object identifier indicated by the object identification code added to each of the objects to be inspected in at least one inspection step of inspecting the object; and a step of creating a database in which the object identifier indicated by the object identification code, information on at least one processing step, and inspection results in at least one inspection step are linked with each other. In the step of adding the object identification code, the object identification code is added to the material member for each container, or to a portion to be the material member among raw materials before the individual material member is separated therefrom.

Thus, according to the container production management system and method of the present invention, the object identification code for indicating the object ranging from the material member to the container is added to each of the material members, or to each of the portions to be the material member among the raw materials before being separated into the individual material member. The object identification code is added thereto in a stage before molding the container, whereby even before molding the container, the material member for each container can be specifically identified to perform production management.

Advantageous Effects of the Invention

According to a container production management system and method of the present invention, each object ranging from a material member to a container can be specifically managed, irrespective of a conveyance order of the object.

BRIEF DESCRIPTION OF THE DRAWINGS

FIG. 8(a) shows a side view of the preform, and FIG. 8(b) shows a top view of the preform

MODE FOR CARRYING OUT THE INVENTION

First Embodiment

Hereinafter, a first embodiment of the present invention will be described with reference to FIGS. 1 to 5A and 5B.

In the first embodiment, a container production management system and method for managing a can body production process for producing a two piece can will be described.

(Can Body Production Process)

A can body production process 100 to be managed in the present embodiment will be described with reference to FIG. 1. The can body production process 100 includes a cupping press step 11, a body maker step 12, a printer step 13 and an inspection step 14.

First, in the cupping press step 11, a circular material member is blanked from a sheet-shaped sheet metal S as a raw material unwound from a coil, and simultaneously molded into a cup shape.

Next, in the body maker step 12, a cup-shaped material member C1 is drawn to thinly stretch a can shell part, thereby further molding a can bottom part into a can body C2.

Next, in the printer step 13, the can shell part of the can body C2 is painted and printed, and further dried and baked.

Then, in the inspection step 14, defects inside and outside a can body C3 through the printer step 13 are inspected. As a result of inspection, the can body C3 judged to be defective is excluded from a production line, and only the can body C3 judged to be a good item is shipped.

It should be noted that the can body production process 100 is not limited to a process including all the processing steps 11 to 13. Moreover, the can body production process 100 may further include various steps such as a cleaning step and a coating step in addition to the processing steps 11 to 13. Moreover, the inspection step 14 may be performed in a plurality of steps.

(Overall Configuration of Management System)

Next, a container production management system for managing the can body production process 100 will be described.

In the present embodiment, each of the objects ranging from the material member to the can body which is the container is identified using an object identifier which is information for identifying each object, thereby being managed.

Figure 1:
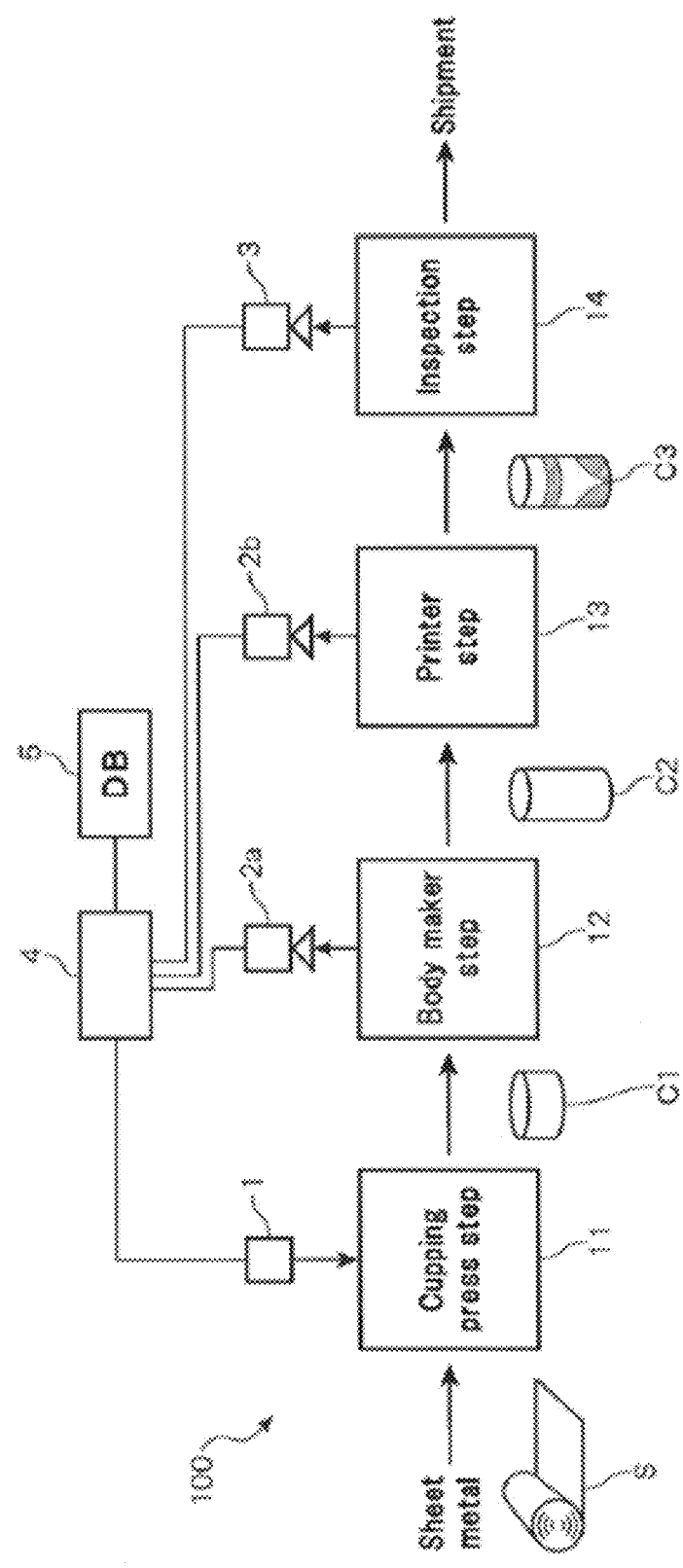
FIG. 1 is a block diagram explaining a container production management system for managing a can body production process according to a first embodiment of the present invention.

As shown in FIG. 1, the container production management system according to the present embodiment is configured of: an object identification code adding means 1 for adding an object identification code indicating an object identifier to an individual object in a cupping press step 11; a body maker step reading means 2a for reading the object identifier indicated by the object identification code added to each of the objects to be processed in a body maker step 12; a printer step reading means 2b for reading the object identifier indicated by the object Identification code added to each of the objects to be processed in a printer step 13; an inspection step reading means 3 for reading the object identifier indicated by the object identification code added to each of the objects to be Inspected in an inspection step 14; and a computing means 4. The computing means 4 creates a database 5 in which the object identifier indicated by the object identification code, information on the body maker step 12 and the printer step 13, and inspection results in the inspection step 14 are linked with each other.

It should be noted that, in the present embodiment, the object identification code is added thereto in the cupping press step 11, but a process for adding the object identification code thereto is not particularly limited, and the object identification code may be added thereto in the body maker step 12, for example.

(Object Identification Code Adding Means)

The object identification code is not particularly limited, as long as the object identification code can indicate the object identifier which is information for identifying each object ranging from the material member to the can body as the container, and may be a character such as an alphanumeric character or a symbol, or an identifier such as a barcode (one-dimensional barcode), for example. The object identification code should be further preferably a two-dimensional code such as a QR code (registered trademark).

A method of adding the object identification code to each object is not particularly limited, either, and the object identification code may be printed on each object with ink, or marked, or printed with a laser beam, for example. Moreover, a seal or a component for displaying the object identification code may be affixed to each object, for example.

Accordingly, the object identification code adding means 1 may be any of a printing device, a marking device, a laser irradiation device and a seal affixing device, for example. (The same shall apply also to any other embodiment.)

Moreover, the object identification code is not limited to a visually or optically readable code, and may be electromagnetically readable code in a contact or non-contact manner. One example of such an object identification code includes a chip that can electromagnetically transmit a signal of a code indicating the object identifier, such as a radio frequency identifier (RFID).

A method of adding such a chip to each object is not particularly limited, and the chip may be affixed to each object, or may be embedded thereinto, for example.

Accordingly, the object identification code adding means 1 may be any of a device provided with a chip affixing mechanism for affixing the chip to the object, and a device provided with a chip embedding mechanism for embedding the chip into the object, for example. (The same shall apply also to any other embodiment.)

Figure 2:
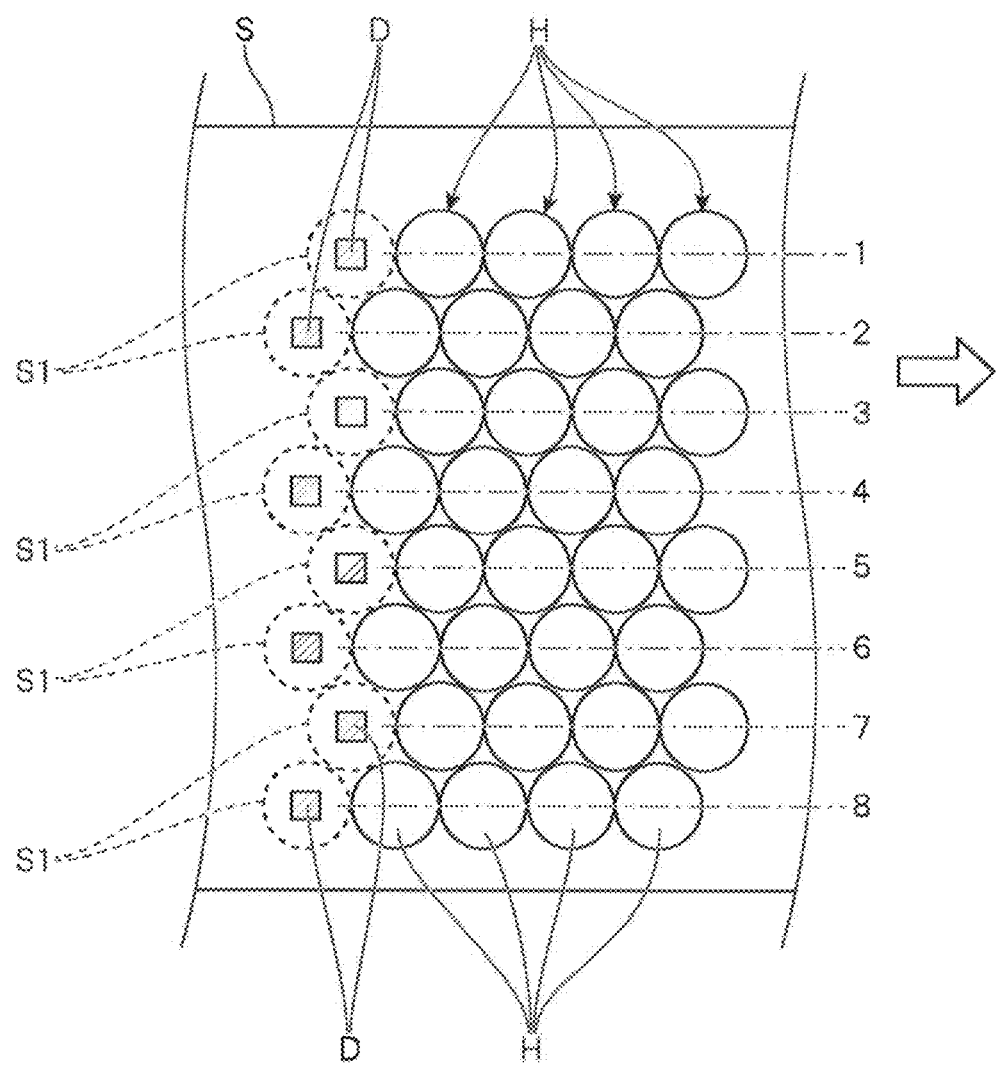
FIG. 2 is a schematic plan view showing a blanking place of a material member and an object identification code in a cupping press step.

Here, FIG. 2 shows a schematic view in which the sheet metal S in the cupping press step 11 is viewed from a top. The sheet metal S shown in the same figure is conveyed from a left side to a right side in the figure, and after the material member C1 is blanked by a blanking means (not shown), a blanked hole H is formed.

In the present embodiment, before blanking an individual material member C1 and separating the blanked member therefrom, an object identification code D is added to a portion S1 to be blanked circularly as the material member C1 among the sheet metals S. In the same figure, a two-dimensional code D as the object identification code D printed on the sheet metal S is schematically shown.

In particular, when a production process of the two piece can is managed, the object identification code D is preferably added to a portion to be blanked into a bottom part of the two piece can among the sheet metals S. In an example shown in FIG. 2, the object identification code D is preferably printed in the vicinity of a center of the circular portion S1 to be blanked.

It should be noted that the object identification code D may be added to the material member C1 blanked from the sheet metal S. For example, the object identification code D may be printed on the material member C1 molded into the cup shape in the cupping press step 1.

In particular, when the production process of the two piece can is managed, the object identification code D should be printed on a portion to be the bottom part of the two piece can, namely, the bottom part of the cup-shaped material member C1.

In the portion to be the bottom part of the two piece can, deformation caused by molding processing of the can body in the body maker step 12 is small, and therefore the object identification code D printed on such a portion also has less deformation. Therefore, also after molding processing, a function of the object identification code D indicating the object identifier is maintained.

Further, in the portion to be the bottom part of the two piece can, printing is not ordinarily performed in the printer step, and therefore printing is not performed on the object identification code D added to such a portion, either. Therefore, also in a printing step, the function of the object identification code D is maintained.

Accordingly, if the object identification code D is added to the portion to be the bottom part of the two piece can, the function of the object identification code D is maintained, irrespective of processing in each process, and the individual object ranging from the material member to the can body can be easily identified.

Moreover, in the cupping press step 11, the circular material member C1 is blanked from the sheet metal S by eight blanking means (not shown) aligned in a direction perpendicular to a conveying direction of the sheet metal S. As a result, as shown in FIG. 2, 8 columns of the blanked holes H aligned along the conveying direction of the sheet metal S are formed in the sheet metal S.

It should be noted that numbers 1 to 8 are added to each of the eight blanking means as blanking means identifiers for identifying the blanking means. The blanking means for blanking each of the portions to be blanked on the sheet metal S is fixed for each lane, and therefore the object identification code D added to the portion to be blanked can be easily associated with the blanking means identifier. Moreover, also for the material member C1 blanked from the sheet metal S, for example, a position of each material member C1 on a belt conveyer that conveys the blanked material member C1 corresponds to each lane, and therefore the object identification code D added to the blanked material member C1 can be easily associated with the blanking means identifier for the blanking means of each lane. Then, as described later, in the database 5, each of the object identifiers (ID) of the object is linked with each of the blanking means identifiers for the blanking means with which the material member C1 of the object is blanked (see Table 1).

(Reading Means)

The body maker step reading means 2a, the printer step reading means 2b and the inspection step reading means 3 are not particularly limited, as long as such means can read the object identification code D. For example, when the object identification code D is optically readable, an image pickup device such as a camera is preferable. Moreover, when the object identification code D is electromagnetically readable, a receiving device such as a reader receiving the signal from the chip, such as RFID, is preferable.

(Body Maker Step Reading Means)

In the body maker step 12, the can bodies C2 are molded in parallel separately in eight lanes (not shown). Accordingly, each of the cup-shaped material members C1 is molded from the cup-shaped material member C1 into the can body C2 by any one of body makers in the eight lanes.

Therefore, in the body maker step 12, the body maker step reading means 2a reads the object identification code D added to the object to be processed in each of the eight lanes. Thus, the object identification code D is read for each lane, and therefore the object identification code D is easily associated with each lane.

Then, as the information on the body maker step 12, information on the lane number is transmitted to the computing means 4 together with information on the object identifier indicated by the object identification code D.

It should be noted that the body maker step reading means 2a may read the object identification code D in each lane with one camera or receiver, or may read the object identification code D with each camera or receiver arranged in each of the eight lanes, for example.

Moreover, in each lane, the body maker step reading means 2a may read the object identification code D of the cup-shaped material member C1 before molding, the object identification code D of the can body C2 after molding, or the object identification code D during molding.

(Printer Step Reading Means)

Figure 3:
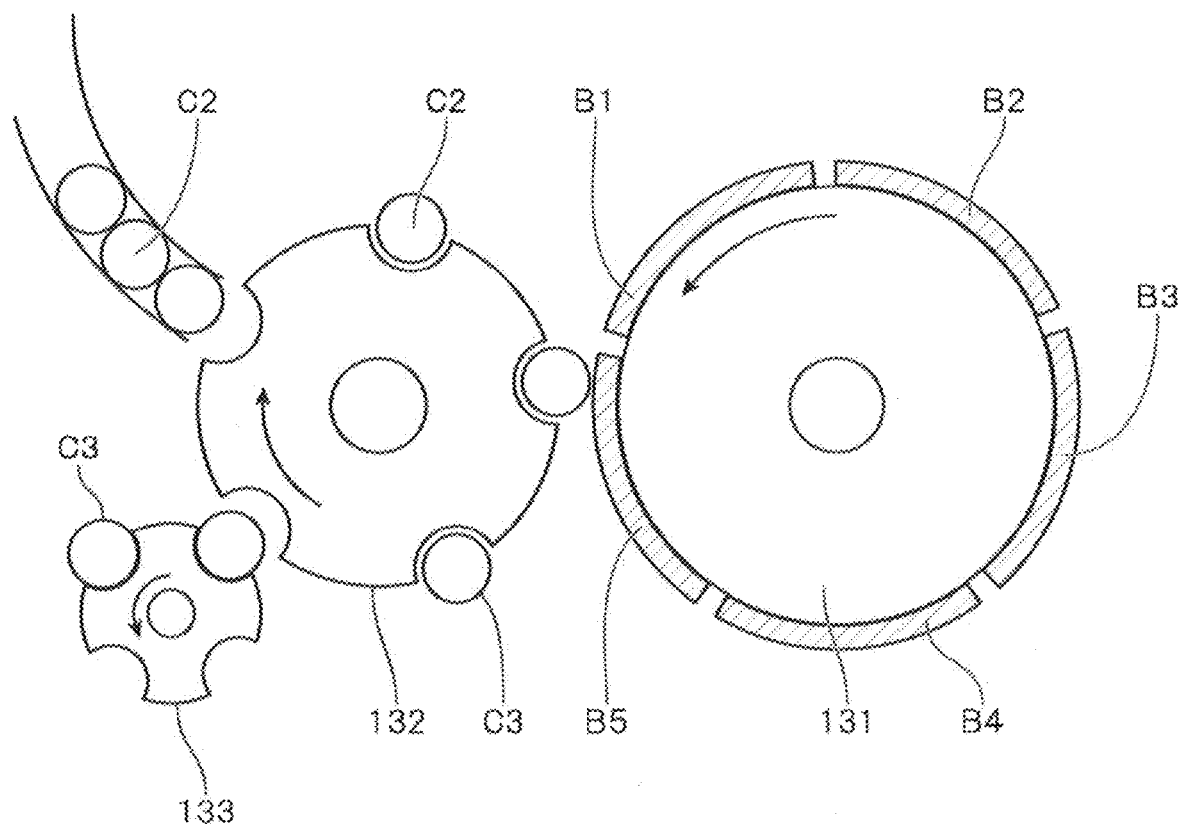
FIG. 3 shows a schematic diagram of a printer step.

FIG. 3 shows a schematic diagram of the printer step. As shown in the same figure, on a peripheral surface of a blanket wheel 131, five blankets (printer plates B) B1, B2, B3, B4 and B5 are provided. Each of the can bodies C2 is held by a mandrel of a mandrel wheel 132, and pressed onto any one of the five printer plates B1 to B5, and a shell part is printed. The can body C3 after printing is transferred from a mandrel hole 132 to a conveyance wheel 133.

The printer step reading means 2b reads the object identification code D added to each of the objects to be processed in the printer step 13. The printer step reading means 2b should preferably read the object identification code D when the can body C2 or C3 is held to the mandrel of the mandrel wheel 132. Timing at which the printer step reading means 2b reads the object identification code D may be before printing, after printing or during printing with the printer plate B.

Moreover, a method of associating the object identification code D of the individual can body read by the printer step reading means 2b with the number of the printer plate B with which the can body is printed is not particularly limited.

For example, the number of the printer plate B is printed on each printer plate B of the blanket wheel 131, or on a place in the vicinity thereof, the printer step reading means 2b picks up an image of the number of the printer plate B on the blanket wheel 131 simultaneously with an image of the object identification code D, whereby the object identification code D of the individual can body may be associated with the number of the printer plate B with which the can body is printed. Moreover, for example, the number of the printer plate B is associated with a rotation angle of the blanket wheel 131, and according to the timing at which the object identification code D is read, the rotation angle of the blanket wheel 131 is detected by a rotation angle detection means such as an encoder, whereby the object identification code D may be associated with the number of the printer plate B. Thus, the object identifier ID indicated by the object identification code D is easily associated with the number of the printer plate.

Then, information on the number of the printer plate B as information on the printer step 13 is transmitted to the computing means 4 together with information on the object identifier ID indicated by the object identification code D.

Moreover, in the printer step 13, the blanket wheel 131, the mandrel wheel 132 and the conveyance wheel 133 rotate in connecting with each other, and therefore the number of each conveyance pocket of the conveyance wheel 133 conveying the individual can body is easily associated with the object identifier ID indicated by the object identification code D together with the number of the printer plate B.

Then, as the information on the printer step 13, information on the number of the conveyance pocket of the conveyance wheel 133 is also transmitted to the computing means 4 together with the information on the object identifier ID indicated by the object identification code D.

(Inspection Step Reading Means)

The inspection step reading means 3 reads the object identifier ID indicated by the object identification code D added to each of the can bodies C3 to be inspected in the inspection step 14. When the object identification code D is optically readable, the image pickup device for picking up an image of the can body C3 for inspection may also serve as the inspection step reading means 3.

Then, the information on the object identifier ID indicated by the object identification code D of the individual can body C3 is transmitted to the computing means 4 together with information on inspection results of the individual can body C3.

It should be noted that the can body C3 shipped through the inspection step 14 is ordinarily loaded on a pallet. During being loaded on the pallet, the object identification code D of each can body C3 is preferably read. Thus, based on product information linked with the object identifier ID indicated by the object identification code D in the database 5, all the can bodies C3 to be loaded on the pallet can be guaranteed to be predetermined products.

(Computing Means)

The computing means 4 creates, applying the object identifier ID indicated by the object identification code D as a key, the database 5 in which the blanking means number in the cupping press step 11, the lane number in the body maker step 12, the printer plate number in the printer step 13, and inspection results in the inspection step 14 are linked (associated) with each other.

It should be noted that the computing means 4 may be configured of a computer, or may be provided on a cloud computing system through Internet. Moreover, the database 5 may also be constructed as data in a storage device, or may be provided on the cloud computing system through Internet.

Table 1 shows one example of a content of the database 5. In Table 1, print date and time on which the object identification code D is printed, and completion date and time of the can body are linked with the object identifier ID.

TABLE 1

| ID | Print date and time | Blanking means | Body maker | Printer plate | Pocket | Inspection results | Completion date and time |
|---|---|---|---|---|---|---|---|
| . | . | . | . | . | . | . | . |
| . | . | . | . | . | . | . | . |
| . | . | . | . | . | . | . | . |
| 9D33FA21 | 2017/*/* *:40:21 | 2 | 3 | 5 | 7 | Good | 2017/*/* *:10:09 |
| 9D33FA31 | 2017/*/* *:40:21 | 3 | 3 | 1 | 8 | Poor | 2017/*/* *:11:09 |
| 9D33FA41 | 2017/*/* *:40:22 | 4 | 2 | 4 | 12 | Good | 2017/*/* *:12:34 |
| . | . | . | . | . | . | . | . |
| . | . | . | . | . | . | . | . |
| . | . | . | . | . | . | . | . |

Thus, according to the embodiment, the object identification code D for identifying the object ranging from the material member C1 to a container C3 is added to each of the portions S1 to be the material member C1 among the sheet metals S of raw materials before being separated into the individual material member, whereby as shown in Table 1, the individual object can be managed by applying the object identifier ID as the key in the production process ranging from a stage of the cupping press step 11 before molding the can body to a completed product in the inspection step 14. Thus, even before completing the can body, the material member C1 for each container can be specifically identified to perform production management.

Next, an analysis example of a factor of occurrence of can body defects using such a database 5 will be described.

Here, a histogram of defects is prepared for each processing step by dividing completion date and time on which scratch defects of the can body occur frequently.

Figure 4A:
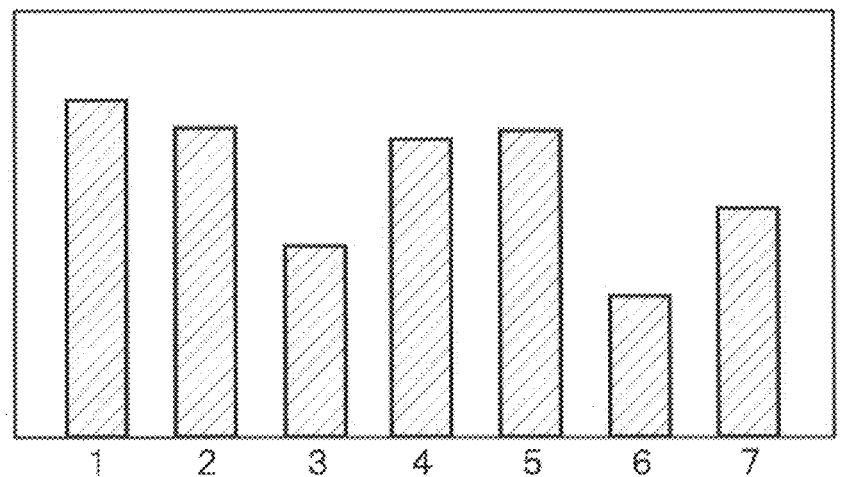
FIG. 4A shows a histogram of defective items for each lane number in a cupping press step.

FIG. 4A is a histogram showing the number of defects occurred for each blanking means in the cupping press step 11. In the present embodiment, the object identification code D is added thereto in the cupping press step 11 in a stage before the body maker step 12, and therefore the individual can body C3 judged to be defective in the inspection step 14 is easily associated with the number of the blanking means in the cupping press step 11 in which the can body C3 is blanked, by applying the object identifier ID indicated by the object identification code D as the key.

From the histogram shown in the same figure, it is known that the defective item is produced, irrespective of the blanking means in the cupping press step 11.

It should be noted that, in the histogram shown in FIG. 4A, when the defective items of the can bodies produced from the material member C1 blanked by a specific blanking means in the cupping press step 11 are significantly more than the defective items of the can bodies produced from the material member C1 blanked by any other blanking means, it is analyzed that occurrence of can body scratch defects is attributed to the specific blanking means with high possibility.

Figure 4B:
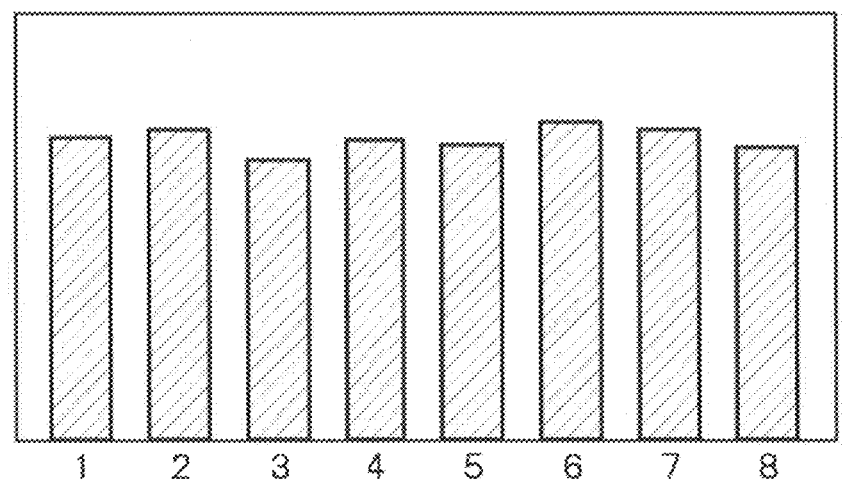
FIG. 4B shows a histogram of defective items for each machine number in a body maker step.

FIG. 4B is a histogram showing the number of defects occurred for each lane in the body maker step 12. The individual can body C3 judged to be defective in the inspection step 14 is easily associated with the lane number of the body maker step 12 in which the can body C3 is molded, by applying the object identifier ID as the key.

From the histogram shown in the same figure, it is known that the defective item is produced, irrespective of the lane number in the body maker step 12.

Figure 5A:
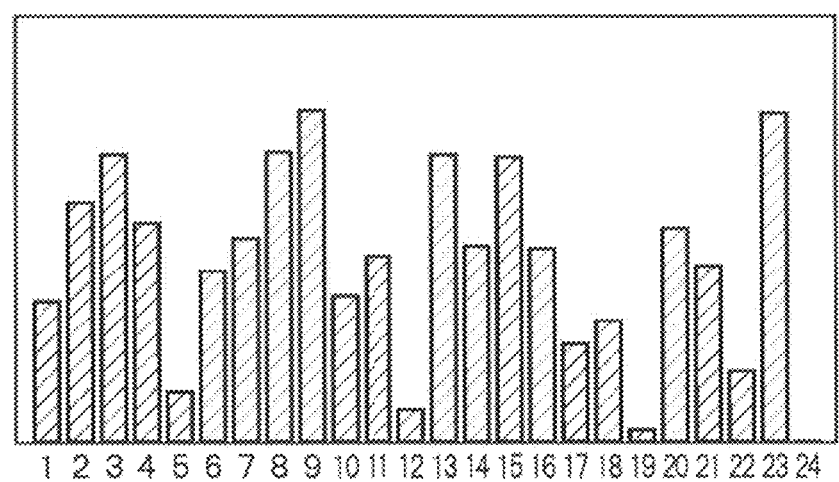
FIG. 5A shows a histogram of defective items for each printer plate number in a printer step.

FIG. 5A is a histogram showing the number of defects occurred for each printer plate B in the printer step 13. Each can body C3 judged to be defective in the inspection step 14 is easily associated with the printer plate number in the printer step 13 in which the can body C3 is printed, by applying the object identifier ID as the key.

From the histogram shown in the same figure, it is known that the defective item is produced, irrespective of the printer plate number in the printer step 13.

Figure 5B:
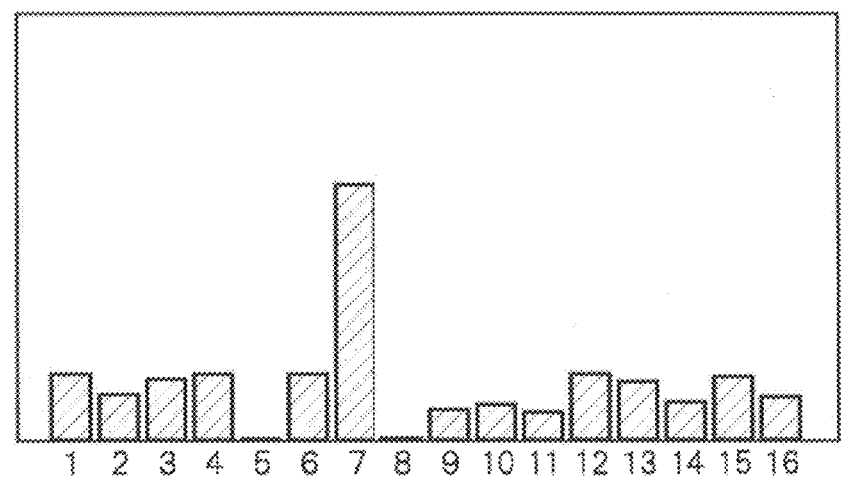
FIG. 5B shows a histogram of defective items for each conveyance pocket number of a conveying device.

FIG. 5B is a histogram showing the number of defects occurred for each pocket number in the printer step 13. The individual can body C3 judged to be defective in the inspection step 14 is easily associated with the conveyance pocket number of the printer step 13 in which the can body C3 is conveyed, by applying the object identifier ID as the key.

From the histogram shown the same figure, it is known that the defective items passing through a pocket in the number "7" in the printer step 13 is significantly more than the defective items passing through any other pockets. Thus, it is analyzed that occurrence of the can body scratch defects is attributed to the pocket in the number "7" with high possibility.

Thus, in the present embodiment, in the cupping press step 11, the object identification code D for identifying the object ranging from the material member C1 to the container C3 is added to each of the material members C1, or to each of the portions S1 to be the material members C1 among the sheet metals S which are the raw materials before being separated into the individual material member C1. The object identification code D is added thereto in the cupping press step 11 in a stage before molding the can body C2, whereby even before completing the container, the material member for each can body can be specifically identified to perform production management. Accordingly, according to the present embodiment, each object ranging from the material member C1 to the can body C3 can be specifically managed, irrespective of a conveyance order of the object.

It should be noted that, in the present embodiment, the production management system of the can body for the two piece can in which the can bottom part and the can shell part are integrally molded is described, but the present invention can also be applied to production management for a three piece can and a bottle can. Moreover, the can body may be a steel can prepared by applying a sheet metal of steel as the raw material, or an aluminum can prepared by applying a sheet metal of aluminum or aluminum alloy as the raw material. Moreover, the can body may have a can bottom part dented in a dome shape, or a flat can bottom part.

Second Embodiment

Hereinafter, a container production management system and method according to a second embodiment of the present invention will be described with reference to FIG. 6 to FIG. 10A and FIG. 10B. In the present embodiment, a container production management system and method for managing a resin container production process for producing a PET bottle from a preform as a material member will be described.

(Resin Container Production Process)

A resin container production process 200 to be managed in the present embodiment will be described with reference to FIG. 6, The resin container production process 200 includes a preform molding step 21, a preform accumulation step 22, a stretching blow step 23, a labeling step 24 and an inspection step 25.

First, in the preform molding step 21, a test tube-shaped preform as a material member is molded from a polyethylene terephthalate (PET) resin. In the present embodiment, a heated and melted resin is injected and filled into a mold at high temperature and high pressure, and then cooled and solidified to perform injection molding of a preform. It should be noted that a preform molding method is not limited to an injection molding method, and the preform may be formed according to a preform compression molding (PCM) method, for example.

In the preform accumulation step 22, molded preforms P1 are accumulated in a container in loose bulk for conveying the preforms P1 to the next stretching blow step 23. It should be noted that, when a production line has an online configuration for directly connecting the preform molding step 21 with the stretching blow step 23, the preform accumulation step 22 can be omitted.

In the stretching blow step 23, a heated preform P1 is inserted into the mold, and then while the preform P1 is stretched in a vertical direction with a stretching rod, compressed air is blown into the preform P1 to swell the preform P1 in a circumferential direction.

In the labeling step 24, a label is covered on a molded PET bottle P2, and the label is shrunk by heating.

Then, in the inspection step 25, visual inspection of a PET bottle P3 through the labeling step 24 is performed. As a result of inspection, the PET bottle P3 judged to be defective is excluded from the production line, and only the PET bottle P3 judged to be a good item is shipped.

It should be noted that the resin container production process 200 is not limited to a process including all the processing steps 21 to 24. Moreover, the resin container production process 200 may be a process further including various steps in addition to the processing steps 21 to 24 described above. Moreover, the inspection step 25 may be performed in a plurality of steps, respectively.

(Overall Configuration of Management System)

Next, a container production management system for managing the resin container production process 200 will be described.

In the present embodiment, each of objects ranging from a material member to a PET bottle which is a container is identified using an object identifier which is information for identifying each object to perform management.

Figure 6:
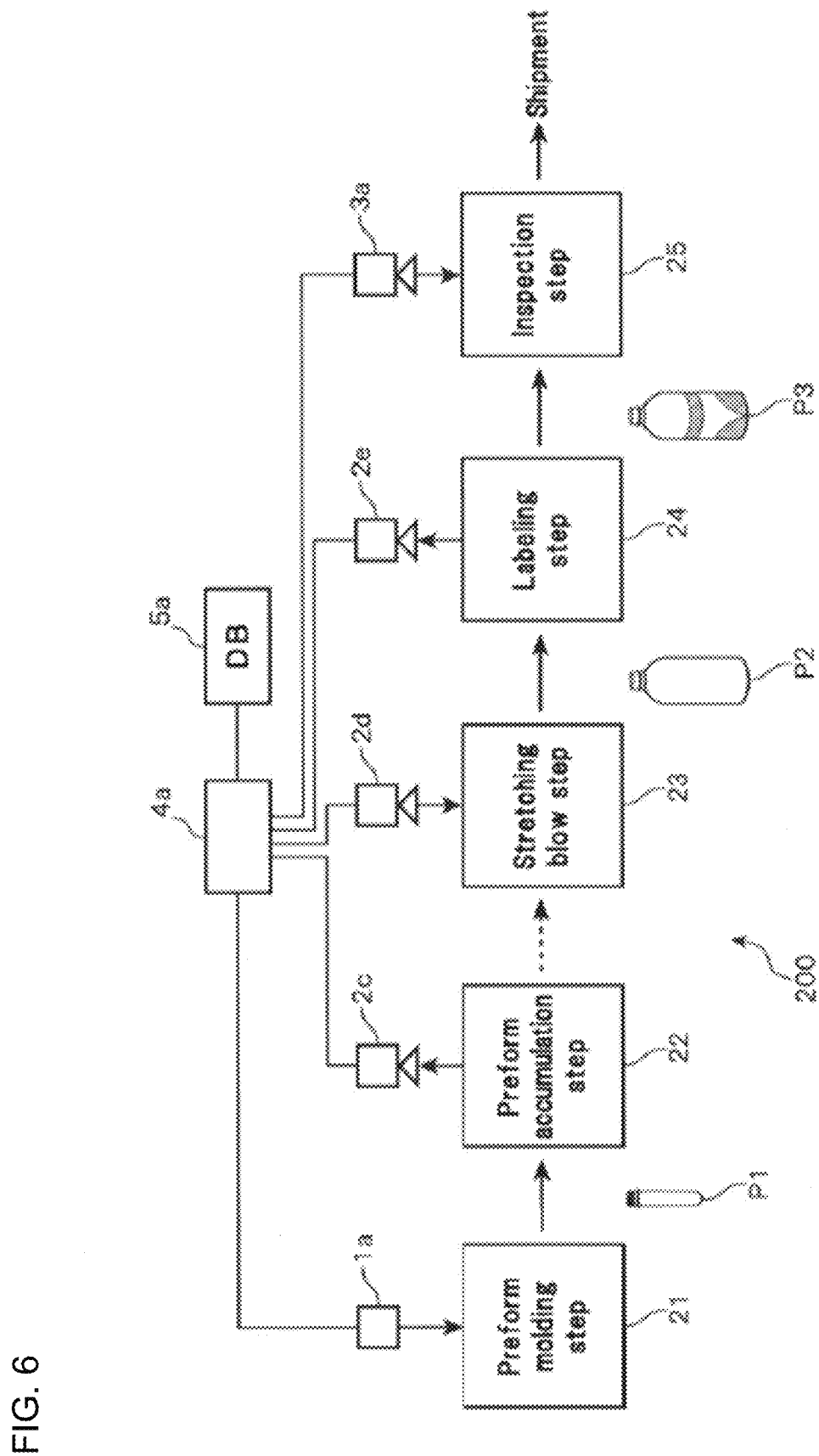
FIG. 6 is a block diagram explaining a container production management system for managing a PET bottle production process according to a second embodiment of the present invention.

As shown in FIG. 6, the container production management system according to the present embodiment is configured of an object identification code adding means 1a for adding an object identification code D indicating an object identifier ID to an Individual preform P1 in the preform molding step 21; a preform accumulation step reading means 2c for reading the object identifier ID indicated by the object identification code D added to each of the preforms P1 in the preform accumulation step 22; a stretching blow step reading means 2d for reading the object identifier ID indicated by the object identification code D added to each of the objects to be processed in the stretching blow step 23; a labeling step reading means 2e for reading the object identifier ID indicated by the object identification code D added to each of PET bottles P2 to be processed in the labeling step 24; an inspection step reading means 3a for reading the object identifier ID indicated by the object identification code D added to each of the objects to be inspected in the inspection step 25; and a computing means 4a. The computing means 4a creates a database 5a in which the object identifier ID indicated by the object identification code D, information on the preform molding step 21, the preform accumulation step 22, the stretching blow step 23 and the labeling step 24, and inspection results in the inspection step 25 are linked with each other.

(Object Identification Code Adding Means)

The object identification code adding means 1a can be formed into the same means as the above-described object identification code adding means 1 in the first embodiment. Moreover, the object identification code D can also be formed into the same means as the object identification code D in the first embodiment.

Figures 7A, 7B:
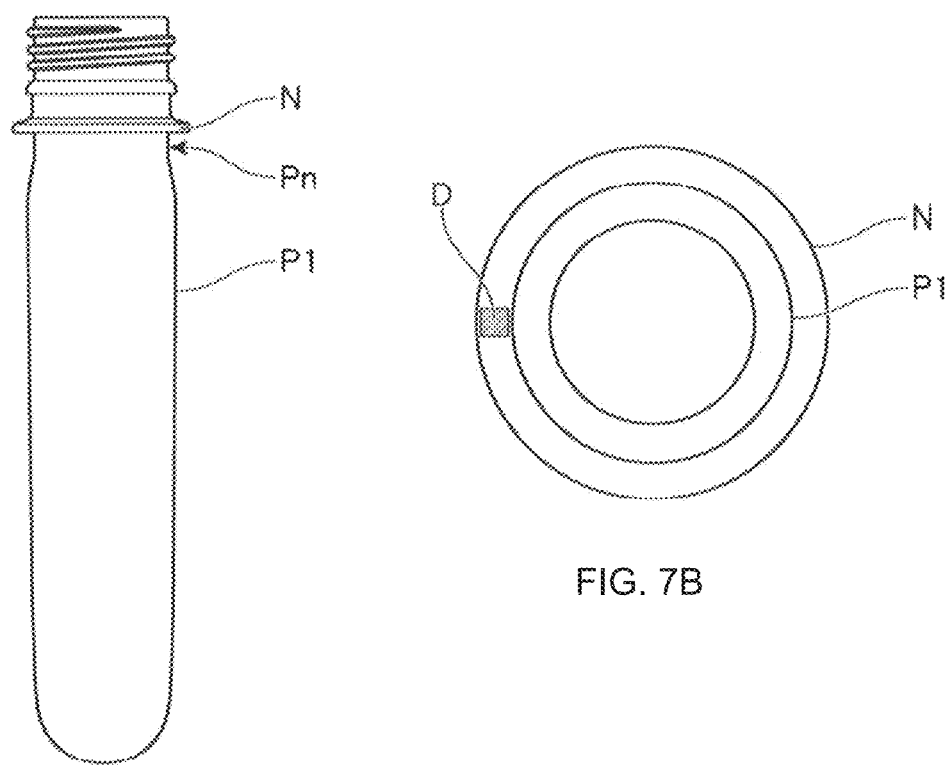
FIG. 7A shows a side view of the preform.
FIG. 7B shows a top view of the preform.

Here, FIGS. 7A and 7B show the preform P1 as the material member. FIG. 7A shows a side view of the preform P1, and FIG. 7B shows a top view of the preform P1. As shown in FIG. 7B, the object identification code D is added to a plane surface place of a neck ring N of the preform P1.

It should be noted that an object identification code D adding position is not limited to the plane surface place of the neck ring N, and the object identification code D is preferably added to part of a region from an opening of the preform P1 to a preform-shape remaining portion Pn which is not deformed in a post-step and immediately below the neck ring N.

Thus, in the region from the opening to the neck ring N, deformation by molding processing in the stretching blow step 22 is little, and therefore deformation is little also in the object identification code D printed in such a portion. Therefore, a function of the object identification code D indicating the object identifier is maintained also after molding processing.

Incidentally, in the preform molding step 21, each of the preforms P1 is molded with any one of a plurality of preform molds.

Figure 8:
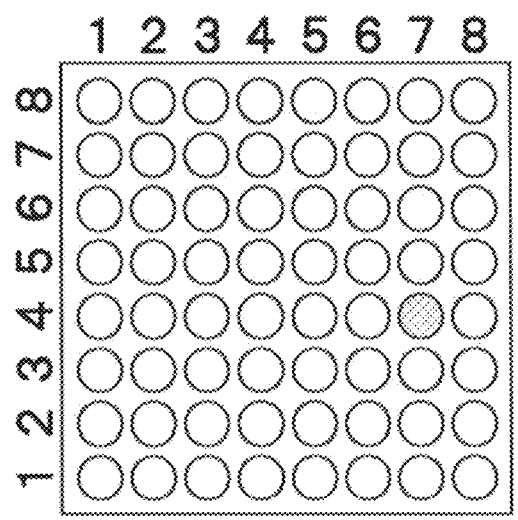
FIG. 8 is a schematic diagram showing alignment of preform molds.

Here, FIG. 8 schematically shows alignment of preform molds for preform injection molding in the preform molding step 21. The same figure shows 64 preform molds aligned in 8 rows and 8 columns. A mold identifier (mold coordinate) represented by a combination of the row number and the column number is added to each of the plurality of preform molds. For example, in the same figure, cross hatching is applied to a preform mold in a row 4 and a column 7 (4×7), whereby the preform mold is shown.

Then, the preforms P1 from which the preform molds are drawn are aligned on reflecting the alignment of preform molds. Therefore, immediately after drawing the preform mold, the object identification code D is added to the preform P1 in a state in which the alignment of preforms P1 is maintained, whereby the object identification code D can be easily associated with the mold identifier for the preform mold with which the preform P1 added with the object identification code D is molded. Then, as described later, in the database 5, the object identifier ID indicated by the object identification code D is linked with the mold identifier for the preform mold with which the preform P1 as each of the material members is molded.

It should be noted that timing at which the object identification code D is added to the preform P1 is not limited to timing immediately after the preform P1 is removed from the preform mold, and the object identification code D of each preform P1 only needs to be linked with the mold identifier for the mold with which each preform P1 is molded. For example, in a state in which the preform P1 is conveyed in an order corresponding to the alignment of preforms P1, the object identification code D may be added to each preform P1.

(Reading Means)

The preform accumulation step reading means 2a, the stretching blow step reading means 2b, the labeling step reading means 2c and the inspection step reading means 3a can be formed into the same means as in the first embodiment, respectively.

(Preform Accumulation Step Reading Means)

In the preform accumulation step 22, the preform accumulation step reading means 2c reads the object identification code D of each preform P1 for each container in which the preforms P1 are accumulated and conveyed. Thus, the container number for identifying the container is easily associated with the object identification code D of each preform P1 conveyed by the container.

It should be noted that the object identification code D of each preform P1 is preferably read before accumulating each preform P1 in the container. Moreover, when the object identification code D is RFID, the object identification code D may be read after accumulation.

Then, information on the container number for conveying the preform in the preform accumulation step 22 is transmitted to the computing means 4a together with the information on the object identifier ID indicated by the object identification code D.

(Stretching Blow Step Reading Means)

Figure 9:
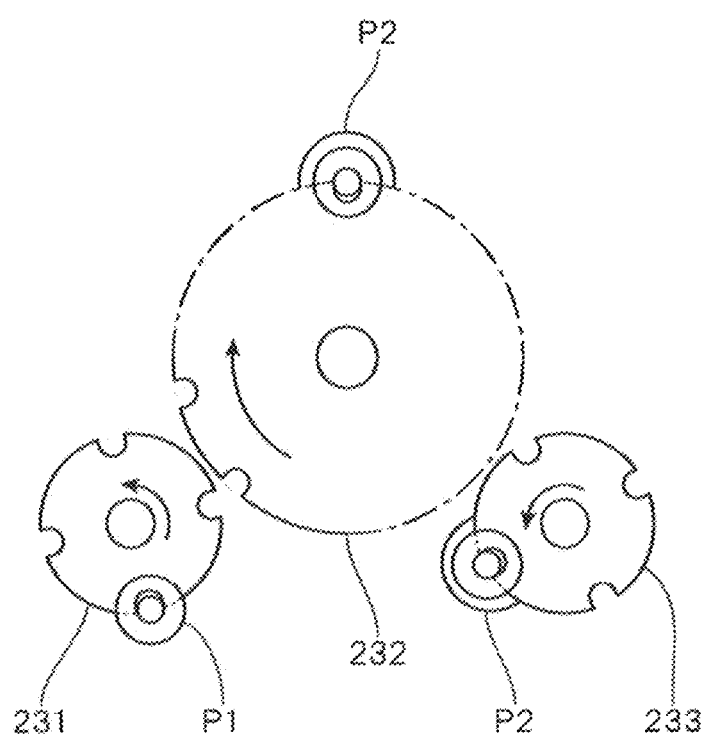
FIG. 9 is a schematic diagram showing a blow pocket in a stretching blow step.

FIG. 9 shows a schematic diagram of the stretching blow step 23. As shown in the same figure, each of the objects to be processed is sequentially transferred to a preform conveyance wheel 231, a blow wheel 232 and a bottle conveyance wheel 233. Then, the preform P1 is molded into the PET bottle P2 in the blow wheel 232.

The stretching blow step reading means 2d reads the object identification code D added to each of the objects to be processed in the stretching blow step 23. The stretching blow step reading means 2b should read the object identification code D when the preform P1 or the PET bottle P2 is held by a pocket of the blow wheel 232. Timing at which the stretching blow step reading means 2d reads the object identification code D may be before stretching blow, after stretching blow or during stretching blow.

Moreover, a method of associating the object identification code D of each object read by the stretching blow step reading means 2d with the pocket number of the blow wheel 232 on which the object is subjected to stretching blow processing is not particularly limited.

For example, the pocket number is printed on the pocket of the blow wheel 232, or on a place in the vicinity thereof, and the stretching blow step reading means 2d picks up an image of the pocket number on the blow wheel 232 simultaneously with an image of the object identification code D, whereby the object identification code D of each object may be associated with the pocket number when the object is subjected to stretching blow processing. Moreover, for example, each pocket number is associated with a rotation angle of the blow wheel 232, and according to timing at which the object identification code D is read, the rotation angle of the blow wheel 232 is detected by a rotation angle detection means such as an encoder, whereby the object identification code D may be associated with the pocket number. Thus, the object identifier ID indicated by the object identification code D is easily associated with the pocket number.

Then, as information on the stretching blow step 23, information on the pocket number of the blow wheel 232 is transmitted to the computing means 4 together with the information on the object identifier ID indicated by the object identification code D.

(Labeling Step Reading Means)

The labeling step reading means 2e reads the object identification code D added to each of the PET bottles P2 or P3 to be processed in the labeling step 24. The labeling step reading means 2e also should preferably read the object identification code D when the PET bottle P2 or P3 is held by a pocket of a wheel (not shown) in the labeling step 24.

For example, in the case of a shrink label, timing at which the labeling step reading means 2e reads the object identification code D may be before covering the shrink label, after shrink by heating or during both thereof.

Moreover, a method of associating the object identification code D of each PET bottle read by the labeling step reading means 2e with the pocket number of the wheel on which the object is subjected to labeling processing is not particularly limited, either, and the object identification code D may be associated with the pocket number in the same manner as in the stretching blow step 23.

(Inspection Step Reading Means)

The inspection step reading means 3a can be formed into the same means as the inspection step reading means 3 in the first embodiment.

The inspection step reading means 3a reads the object identification code D added to each of the PET bottles P3 to be inspected in the inspection step 25. When the object identification code D is optically readable, an image pickup device for picking up an image of the PET bottle P3 for inspection may also serve as the inspection step reading means 3a.

Then, the information on the object identifier ID indicated by the object identification code D of the individual PET bottle P3 is transmitted to the computing means 4a together with information on inspection results of the individual PET bottle P3.

(Computing Means)

The computing means 4a can be formed into the same means as the computing means 4 in the first embodiment.

The computing means 4a creates, by applying the object identifier ID indicated by the object identification code D as a key, the database 5a in which the mold identifier in the preform mold in the preform molding step 21, the container number in the preform accumulation step 22, the pocket number in the stretching blow step 23, the pocket number in the labeling step 24, and inspection results in the inspection step 25 are linked (associated) with each other.

Table 2 shows one example of a content of the database 5a according to the present embodiment. In Table 2, print date and time on which the object identification code D is printed, and completion date and time of the PET bottle are further linked with the object identifier ID.

TABLE 2

| ID | Print date and time | Mold coordinate | Container | Stretching blow pocket | Label pocket | Inspection results | Completion date and time |
|---|---|---|---|---|---|---|---|
| . | . | . | . | . | . | . | . |
| . | . | . | . | . | . | . | . |
| . | . | . | . | . | . | . | . |
| 47A5B301 | 2017/*/* *:20:33 | 6 × 3 | 12 | 12 | 8 | Good | 2017/*/* *:03:10 |
| 47A5B401 | 2017/*/* *:20:34 | 6 × 4 | 12 | 7 | 8 | Poor | 2017/*/* *:03:11 |
| 47A5B501 | 2017/*/* *:20:34 | 6 × 5 | 12 | 5 | 6 | Good | 2017/*/* *:03:20 |
| . | . | . | . | . | . | . | . |
| . | . | . | . | . | . | . | . |
| . | . | . | . | . | . | . | . |

Thus, according to the embodiment, the object identification code D for identifying the object ranging from the preform P1 to the PET bottle P3 is added to the preform P1 which is the material member, whereby as shown in Table 2, in a production process ranging from a stage of the preform molding step 21 before molding the PET bottle to a completed product in the inspection step 25, the individual object can be managed by applying the object identifier ID as the key. Thus, even before molding the PET bottle, the preform P1 as the material member can be specifically identified to perform production management.

Next, an analysis example of a factor of occurrence of PET bottle defects using such a database 5a MI be described.

Here, a histogram of defects is prepared for each processing step by dividing completion date and time on which PET bottle scratch defects occur frequently.

Figure 10A:
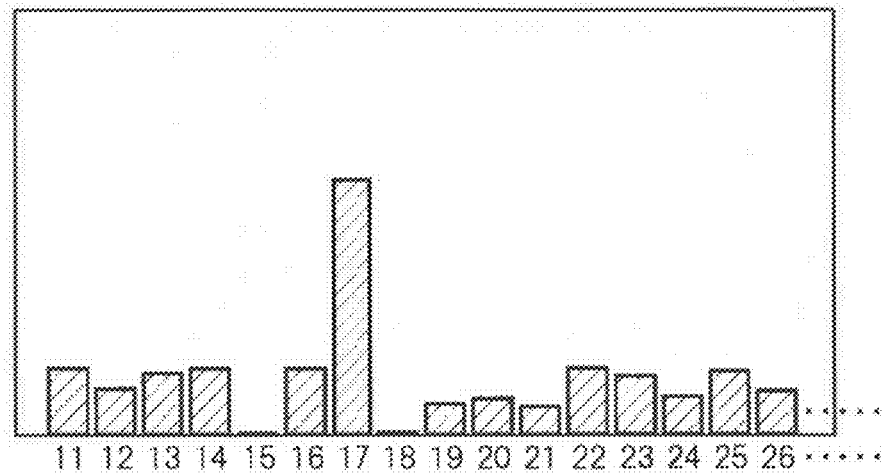
FIG. 10A shows a histogram of defective items for each container number in a preform accumulation step.

FIG. 10A is a histogram showing the number of defects occurred for each mold identifier for the preform mold in the preform molding step 21. In the present embodiment, the object identification code D is added to the preform P1 in the preform molding step 21 as a stage before the stretching blow step 22, and therefore the individual PET bottle P3 judged to be defective in the inspection step 25 is associated with the mold identifier for the mold molding the preform P1 as the material member of the PET bottle P3, by applying the object identifier ID indicated by the object identification code D as the key.

From the histogram shown in the same figure, it is known that, as for the defective items, PET bottle defective items prepared by applying, as the material member, the preform P1 molded with a mold having a mold identifier "17" (1×7) are significantly more than the defective items with any other molds. In this case, it is analyzed that occurrence of PET bottle scratch defects is attributed to the mold having the mold identifier "17" with high possibility.

Figure 10B:
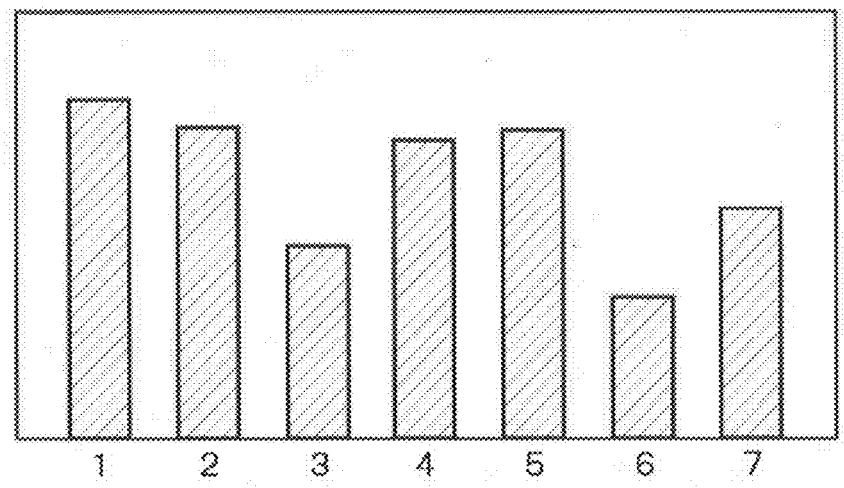
FIG. 10B shows a histogram of defective items for each pocket number of a blow wheel in a stretching blow step.

FIG. 10B is a histogram showing the number of defects occurred for each container in the preform accumulation step 22. The individual PET bottle P3 judged to be defective in the inspection step 25 is easily associated with the container number conveying the PET bottle P3, by applying the object identifier ID as the key.

From the histogram shown in the same figure, it is known that the defective item is produced, irrespective of the container number in the preform accumulation step 22.

Figure 10C:
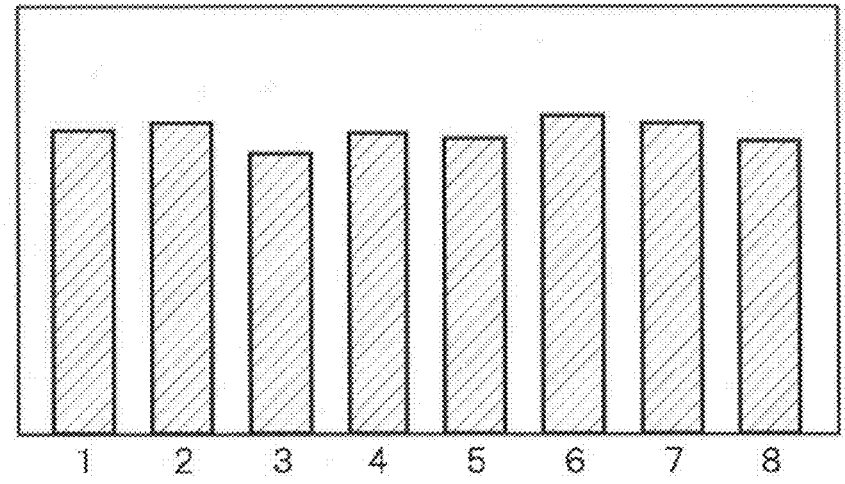
FIG. 10C shows a histogram of defective items for each mold identifier in a preform molding step.

FIG. 10C is a histogram showing the number of defects occurred for each pocket of the blow wheel 232 in the stretching blow step 23. The individual PET bottle P3 judged to be defective in the inspection step 25 is easily associated with the pocket number conveying the PET bottle P3, by applying the object identifier ID as the key, according to the database 5a.

From the histogram shown in the same figure, it is known that the defective item is produced, irrespective of the pocket number in the stretching blow step 23.

Moreover, the PET bottle P3 judged to be defective is also easily associated with the pocket number in the labeling step 24, by applying the object identifier ID as the key, according to the database 5. Then, although not shown, it was confirmed that the defective item is produced, irrespective of the pocket number in the labeling step 24 in the same manner.

Thus, in the present embodiment, in the preform molding step 21 as a stage before the molding step of the PET bottle P2, the object identification code D for identifying the object ranging from the preform P1 to the PET bottle P3 is added to each of the preforms P1 as the material member. Thus, even before molding the PET bottle, the preform P1 which is the material member can be specifically identified to perform production management. Accordingly, according to the present embodiment, each of the objects ranging from the preform P1 as the material member to the PET bottle P3 can be specifically managed, irrespective of a conveyance order of the object.

It should be noted that, in the present embodiment, the production management system and method for the resin container for producing the PET bottle are described, but the present invention can also be applied to a production management system and method for a resin container prepared using a resin other than polyethylene terephthalate.

Third Embodiment

A third embodiment of the present invention win be described with reference to FIG. 11. In the present embodiment, a container production management system and method for managing a pouch production process for producing a pouch container will be described.
(Pouch Production Process)

A pouch production process 300 to be managed in the present embodiment will be described with reference to FIG. 11. The pouch production process 300 includes: an original roll printing step 31 for printing on a base material of a raw material sheet to produce a print original roll R1; an original roll laminator step 32 for laminating a film to the print original roll R1 to produce a laminate original roll R2; an original roll slitter step 33 for slitting the laminate original roll R2 In a predetermined width to produce a slit original roll R3; a bag-making step 34 for making a pouch container U from the slit original roll R3; and an inspection step 35 for inspecting the pouch container U made.

In the bag-making step 34, the raw material sheet unwound from the slit original roll R3 is cut to perform bottom seal and side seal, and when necessary, to attach a spout.

Then, in the inspection step 35, a defect on an outer surface of the pouch container U through the bag-making step 34 is inspected. As a result of inspection, the pouch container U judged to be defective is excluded from a production fine, and only the pouch container U judged to be a good item is shipped.
(Overall Configuration of Management System)

Next, the container production management system for managing the pouch production process 300 will be described.

In the present embodiment, the pouch production process 300 is managed by identifying each of objects ranging from a sheet piece which is a material member for an individual container to a pouch by using an object identifier which is information for identifying each object.

Figure 11:
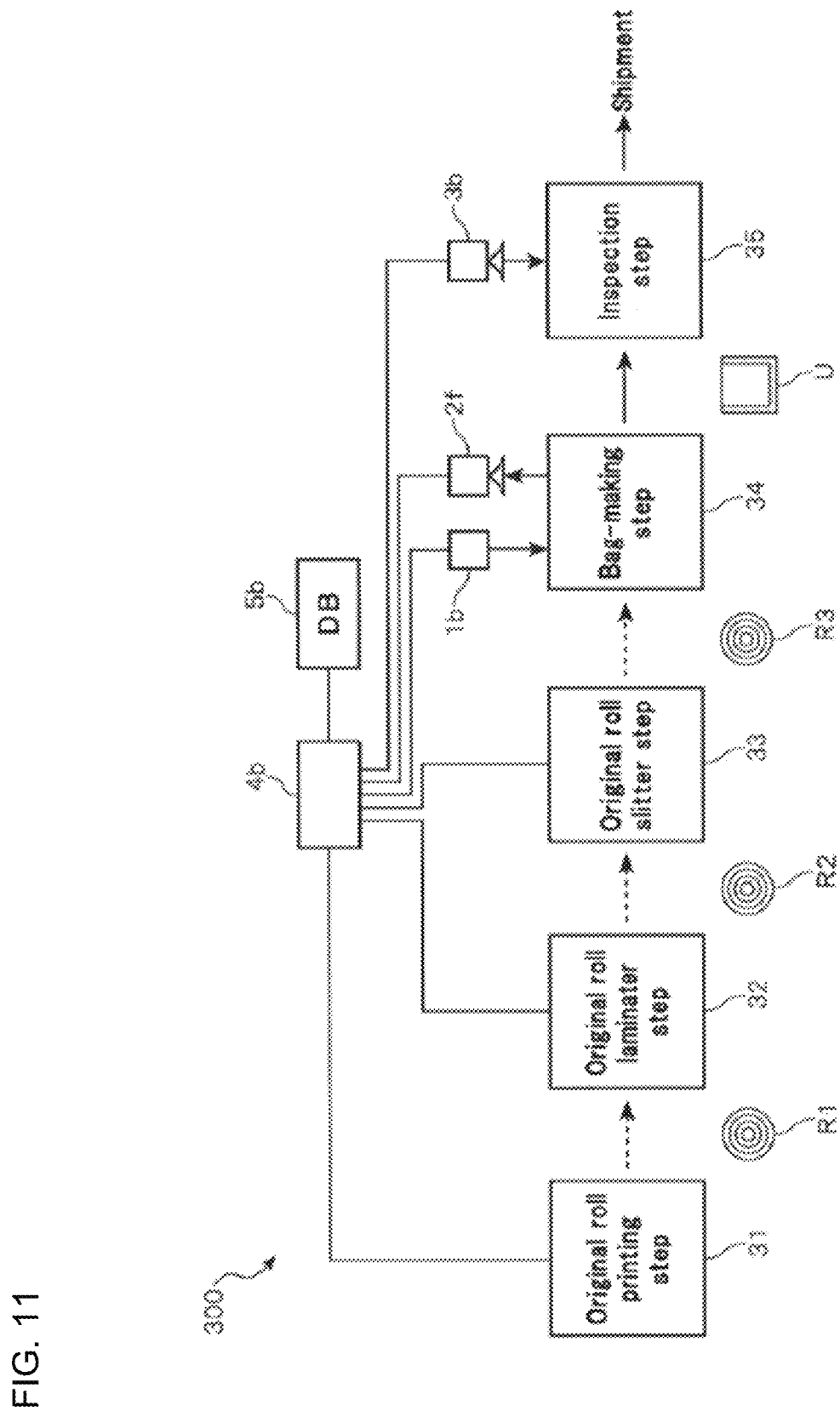
FIG. 11 is a block diagram explaining a container production management system for managing a pouch container production process according to a third embodiment of the present invention.

As shown in FIG. 11, the container production management system according to the present embodiment is configured of an object identification code adding means 1b for adding an object identification code indicating an object identifier to an individual object in the bag-making step 34; a reading means 2f for reading the object identification code D added to each of the objects to be processed in the bag-making step 34; an inspection step reading means 3b for reading the object identification code D added to each of the objects to be inspected in the inspection step 35; and a computing means 4b. The computing means 4 creates a database 5b in which the object identifier ID indicated by the object identification code D, information on the bag-making step 34, and inspection results in the inspection step 35 are linked with each other.
(Object Identification Code Adding Means)

The object identification code adding means 1b can be formed into the same means as the above-described object identification code adding means 1 in the first embodiment. Moreover, the object identification code D can also be formed into the same object identification code D in the first embodiment.

In the bag-making step 34, in cutting of the raw material sheet, the sheet piece for each pouch as the material member is cut or blanked by a plurality of cutter blades (not shown). As an object Identification code, the object identification code D is added to a portion to be blanked of the raw material sheet before cutting an individual sheet piece or the like and separating the cut piece therefrom, or to a sheet piece immediately after being blanked.

The number as each identifier is added to each cutter blade, and therefore the object identification code D added to the portion to be blanked, or to the blanked sheet piece can be easily associated with the number of the cutter blade.

It should be noted that the object identification code D is preferably printed at timing at which the raw material sheet to be intermittently conveyed is stopped. Moreover, when the object identification code D is a barcode, the object Identification code D can be added thereto not only in the case where the raw material sheet or the sheet piece is stopped, but also at timing at which the raw material sheet or the sheet piece is moving. Therefore, the object identification code D can also be added thereto in an upstream stage before intermittently conveying the raw material sheet.

Moreover, for example, in the case of a floss pouch with a spout, the object identification code may be added to the pouch when the pouch is three-dimensionally molded.

(Reading Means)

The step reading means 2f can be formed into the same means as in the first embodiment.

As the step reading means 2f, for example, when the sheet piece as the material member is heat-sealed by a plurality of seal means, the step reading means 2f preferably reads the object identification code D for each seal means. Thus, each of the objects ranging from the sheet piece to the pouch container U can be easily associated with the seal means with which the object is heat-sealed.

(Inspection Step Reading Means)

The inspection step reading means 3b can be formed into the same means as the inspection step reading means 3 in the first embodiment.

The inspection step reading means 3b reads the object identification code D added to each of the pouch containers U to be inspected in the inspection step 35. When the object identification code D is optically readable, an image pickup device for picking up an image of the pouch container U for inspection may also serve as the inspection step reading means 3b.

Then, information on the object identifier (pouch ID) indicated by the object identification code D of the individual pouch container U is transmitted to the computing means 4b together with information on inspection results of the individual pouch container U.

(Computing Means)

The computing means 4b can be formed into the same means as the computing means 4 in the first embodiment.

The computing means 4b creates, by applying the object identifier (pouch ID) indicated by the object identification code D as a key, the database 5b in which the number of the cutter blade and the number of the seal means in the bag-making step 34 for the pouch, and inspection results in the inspection step 35 are linked with each other.

Moreover, the raw material sheet is wound up into a roll-shaped original roll after processing in each processing step of the original roll printing step 31, the original roll laminator step 32 and the original roll slitter step 33. According to the computing means 4b, an original roll identifier for identifying an individual original roll is each set to the print original roll R1, the laminate original roll R2 and the slit original roll R3 as produced in each process.

The computing means 4b further links, in the database 5b, the object identifier of the individual pouch (pouch ID) with the original roll identifier (slit original roll ID) of the slit original roll R3 from which the raw material sheet is unwound, the individual object being separated from the raw material sheet.

Table 3 shows one example of a content of the database 5b according to the present embodiment. In Table 2, print date and time on which the object identification code D is printed, and completion date and time of the pouch container are further linked with the object identifier (pouch ID).

TABLE 3

| Pouch ID | Completion date and time | Slit original roll ID | Cutter blade | Seal means | Inspection results |
|---|---|---|---|---|---|
| . | . | . | . | . | . |
| . | . | . | . | . | . |
| . | . | . | . | . | . |
| 49A5B301 | 2017/*/* *:10:50 | 49A5B6301 | 2 | 1 | Poor |
| 49A5B401 | 2017/*/* *:10:50 | 49A5B6301 | 2 | 1 | Poor |
| 49A5B501 | 2017/*/* *:10:50 | 49A5B6301 | 1 | 2 | Good |
| . | . | . | . | . | . |
| . | . | . | . | . | . |
| . | . | . | . | . | . |

Thus, according to the embodiment, the object identification code D for identifying the object ranging from the sheet piece to the pouch container U is added to the sheet piece which is the material member, whereby as shown in Table 3, an individual object can be managed by applying the object identifier ID as the key in a production process ranging from a stage of the sheet piece before molding the pouch container U to a completed product in the inspection step 35. Thus, even before molding the pouch container U, the sheet piece as the material member can be specifically identified to perform production management.

For example, from the database shown in Table 3, when a frequency of occurrence of defects is particularly high in the pouch container U cut with a cutter blade having the identification number "2", it is analyzed that occurrence of defective items is attributed to the cutter blade having the identification number "2" with high possibility.

(Linking with Original Roll)

Incidentally, in production of the pouch container U, a feed rate change or meandering of the raw material sheet influences on a dimension of the pouch container U made or a dimension of a laminated part to serve as a cause of occurrence of the detective item in several cases. The feed rate change or meandering of the raw material sheet easily occurs when feed from one original roll is switched to a next original roll before completion of the feed, and therefore a database is preferably created by linking information on presence or absence or time of day of switching with the original roll identifier.

Then, in the present embodiment, as shown in Table 3, linking with the slit original roll R3 which is the original roll of the sheet piece can also be performed by applying the object identifier ID as the key.

It should be noted that, in the database 5b, in addition to items shown in Table 3, for example, a longitudinal dimension and a lateral dimension of the pouch container U, and a slip dimension when the sheet pieces are laminated to each other may be linked with each other by applying the object identifier ID as the key.

Further, in the present embodiment, in the database 5*b*, the original roll identifiers of the original rolls in each processing step are associated with each other. Therefore, a slit original roll identifier, a laminate original roll identifier and a print original roll identifier can be associated with each other by tracing back the laminate original roll R2 and the print original roll R1 from the slit original roll R3.

Table 4 shows a correspondence relationship between the slit original roll R3 and the laminate original roll R2.

It should be noted that, in addition to items shown in Table 4, information on an original roll length of each slit original roll may be linked with each other by applying a slit original roll identifier ID as the key.

TABLE 4

| Slit original roll ID | Start date and time | Completion date and time | Supply laminate original roll 1 | Supply laminate original roll 2 | Slitter number |
|---|---|---|---|---|---|
| . | . | . | . | . | . |
| . | . | . | . | . | . |
| . | . | . | . | . | . |
| 49A58301 | 2017/*/* *:00:50 | 2017/*/* *:10:50 | 48A5B301 | None | 1 |
| 49A5B401 | 2017/*/* *:00:50 | 2017/*/* *:10:50 | 48A5B301 | 48A5B302 | 2 |
| 49A5B501 | 2017/*/* *:00:50 | 2017/*/* *:10:50 | 48A5B301 | 48A5B302 | 3 |
| . | . | . | . | . | . |
| . | . | . | . | . | . |
| . | . | . | . | . | . |

As shown in Table 4, the slit original roll identifier ID is linked with a laminate original roll identifier ID of the laminate original roll R2 before being slit-processed into each slit original roll R3. One slit original roll R3 is processed from one laminate original roll R2 in one case and processed by switching two laminate original rolls R2 in another case.

According to Table 4, each slit original roll R3 can be linked with the laminate original roll R2 being a suppler by tracing back. For example, a slit original roll identifier ID "49A5B301" is linked with a laminate original roll identifier ID "48A5B301".

Accordingly, for example, when the defective item is produced by the feed rate change or meandering by switching two laminate original roll identifiers R1, namely, the laminate original roll identifiers ID "48A5B301" and "48A5B302," the cause of occurrence of the defective item can be analyzed by tracing back the slit original roll identifier ID and the laminate original roll identifier ID as linked with each other in the database 5*b* from the object identifier ID of the pouch container U of the defective item.

Further, Table 5 shows a correspondence relationship between the laminate original roll R2 and the print original roll R1.

TABLE 5

| Laminate original roll ID | Start date and time | Completion date and time | Supply print original roll 1 | Supply print original roll 2 | Laminate method |
|---|---|---|---|---|---|
| . | . | . | . | . | . |
| . | . | . | . | . | . |
| . | . | . | . | . | . |
| 48A5B301 | 2017/*/* *:10:50 | 2017/*/* *:00:00 | 47A5B301 | 47A5B302 | TL |
| 48A5B401 | 2017/*/* *:10:50 | 2017/*/* *:00:00 | 47A5B301 | 47A5B302 | TL |
| 48A5B501 | 2017/*/* *:10:50 | 2017/*/* *:00:00 | 47A5B301 | None | HM |
| . | . | . | . | . | . |
| . | . | . | . | . | . |
| . | . | . | . | . | . |

As shown in Table 5, the laminate original roll identifier ID is linked with a print original roll identifier ID of the print original roll R1 before being laminated into each laminate original roll R2. One laminate original roll R2 is processed from one print original roll R1 in one case, and processed by switching two print original rolls R1 in another case.

According to Table 5, each laminate original roll R2 can be linked with the print original roll R1 as the supplier by tracing back. For example, a laminate original roll identifier ID "48A58301" is linked with print original roll identifiers ID "47A5B301" and "47A58302".

Further, Table 6 shows information on the print original roll R1.

TABLE 6

| Print original roll ID | Start date and time | Completion date and time | Original roll length (m) | Front-surface raw material | Back-surface raw material | Printing machine number |
|---|---|---|---|---|---|---|
| . | . | . | . | . | . | . |
| . | . | . | . | . | . | . |
| . | . | . | . | . | . | . |
| 47A5B301 | 2017/*/* *:10:50 | 2017/*/* *:00:00 | 4020 | Paper | None | 1 |
| 47A5B401 | 2017/*/* *:10:50 | 2017/*/* *:00:00 | 3980 | PET | Polyester | 2 |
| 47A5B501 | 2017/*/* *:10:50 | 2017/*/* *:00:00 | 4050 | Aluminum | None | 3 |
| . | . | . | . | . | . | . |
| . | . | . | . | . | . | . |
| . | . | . | . | . | . | . |

As shown in Table 6, it is known that the print original roll identifier ID "47A5B301" linked with the laminate original roll identifier ID "48A5B301" in Table 5 is printed with a printing machine having the identification number "1".

Accordingly, for example, when occurrence of the defective item is attributed to a specific printing machine, the cause of occurrence of the defective item can be analyzed by tracing back the slit original roll identifier ID, the laminate original roll identifier ID and the print original roll identifier ID as linked with each other in the database from the object identifier ID of the pouch.

Moreover, the present invention is not limited to the embodiments described above, and the present invention can be practiced with various modifications within the scope of the present invention.

The entire contents of the documents described in this description and the description of the Japanese application serving as a basis of claiming the priority concerning the present application to the Paris Convention are incorporated by reference herein.

EXPLANATION OF NUMERICAL SYMBOLS 1, 1a, 1b Object identification code adding means
2a to 2f Reading means
3, 3a, 3b Inspection step reading means
4, 4a, 4b Computing means
5, 5a, 5b Database
100 Two piece can production process
11 Cupping press step
12 Body maker step
13 Printer step
14 Inspection step
21 Preform molding step
22 Preform accumulation step
23 Stretching blow step
24 Labeling step
25 Inspection step
131 Blanket wheel
132 Mandrel wheel
133 Conveyance wheel
231 Preform conveyance wheel
232 Blow wheel
233 PET bottle conveyance wheel
C1 Material member
C2, C3 Can body
P1 Preform
P2, P3 PET bottle
H Blanked hole
S Sheet metal
S1 Portion to be blanked

The invention claimed is:

1. A container production management system for managing a container production process, comprising:
an adding device which adds an object identification code indicating an object identifier, which is information for identifying an object ranging from a material member for each container to the container, to each of the objects;
a processing process reader which reads the object identifier indicated by the object identification code added to each of the objects to be processed in at least one processing process in which the object added with the object identification code is processed;
an inspection process reader which reads the object identifier indicated by the object identification code added to each of the objects to be inspected in at least one inspection process in which the object added with the object identification code is inspected; and
a processing circuitry which creates a database in which the object identifier indicated by the object identification code, information on at least one processing process, and inspection results in at least one inspection process are linked with each other,
wherein the adding device adds the object identification code to the material member for each container, or to a portion to be the material member among raw materials before the material member is separated therefrom,
wherein the container production process is a resin container production process in which a resin container is produced as the container,
wherein the adding device adds the object identification code to part of a region from an opening of a preform as the material member to a preform-shape remaining portion which is not deformed in a post-processing and immediately below a neck ring.

2. The container production management system according to claim 1, wherein
each of the objects is processed in any one of a plurality of processing lanes in at least one processing process,
the processing process reader reads the object identifier indicated by the object identification code added to each of the objects, in each of the plurality of processing lanes,
information on at least one processing process includes a lane identifier assigned to each of the plurality of processing lanes, and
the processing circuitry links, in the database, the object identifier of each of the objects with the lane identifier assigned to the lane in which each of the objects is processed.

3. The container production management system according to claim 1, wherein
each of the objects is processed in any one of a plurality of processors, or is conveyed by any one of a plurality of conveyers in at least one processing process,
the processing process reader reads the object identifier indicated by the object identification code added to each of the objects, in each of the plurality of processors or in each of the plurality of conveyers,
information on at least one processing process includes a device identifier assigned to each of the plurality of processors or each of the plurality of conveyers, and
the processing circuitry links, in the database, the object identifier of each of the objects with the device identifier assigned to the processor in which each of the objects is processed, or the conveyer by which each of the objects is conveyed.

4. The container production management system according to claim 1, wherein
each of the preforms is molded by any one of a plurality of preform molds in a preform molding process,
a mold identifier is assigned to each of the plurality of preform molds, and
the processing circuitry further links, in the database, the object identifier of each of the preforms with the mold identifier assigned to the preform mold with which each of the preforms is molded.

5. A container production management system for managing a container production process, comprising:
an adding device which adds an object identification code indicating an object identifier, which is information for identifying an object ranging from a material member for each container to the container, to each of the objects;
a processing process reader which reads the object identifier indicated by the object identification code added to each of the objects to be processed in at least one processing process in which the object added with the object identification code is processed;

an inspection process reader which reads the object identifier indicated by the object identification code added to each of the objects to be inspected in at least one inspection process in which the object added with the object identification code is inspected; and a processing circuitry which creates a database in which the object identifier indicated by the object identification code, information on at least one processing process, and inspection results in at least one inspection process are linked with each other, wherein the adding device adds the object identification code to the material member for each container, or to a portion to be the material member among raw materials before the material member is separated therefrom, wherein the container production process is a can body production process in which a can body is produced as the container, wherein the adding device adds the object identification code to the material member blanked from a sheet metal as the raw material, or to each of portions to be blanked as the material member among the sheet metals.

6. The container production management system according to claim 5, wherein the can body is a two piece can, and the adding device adds the object identification code to a portion to be a bottom part of the two piece can among the material members, or to each of portions to be blanked to be the bottom part of the two piece can among the sheet metals.

7. The container production management system according to claim 5, wherein each of the material members is blanked from the sheet metal by any one of a plurality of blankers in a process in which the material member is blanked from the sheet metal, a blanker identifier is assigned to each of the plurality of blankers, and the processing circuitry further links, in the database, the object identifier of each of the objects with the blanker identifier assigned to the blanker with which the material member of each of the objects is blanked.

8. A container production management system for managing a container production process, comprising:

an adding device which adds an object identification code indicating an object identifier, which is information for identifying an object ranging from a material member for each container to the container, to each of the objects;

a processing process reader which reads the object identifier indicated by the object identification code added to each of the objects to be processed in at least one processing process in which the object added with the object identification code is processed;

an inspection process reader which reads the object identifier indicated by the object identification code added to each of the objects to be inspected in at least one inspection process in which the object added with the object identification code is inspected; and a processing circuitry which creates a database in which the object identifier indicated by the object identification code, information on at least one processing process, and inspection results in at least one inspection process-are linked with each other, wherein the adding device adds the object identification code to the material member for each container, or to a portion to be the material member among raw materials before the material member is separated therefrom, wherein the container production process is a pouch production process in which a pouch container is produced as the container, wherein the adding device adds the object identification code to a sheet piece as the material member to be separated from a raw material sheet as the raw material, or to a portion to be separated as the sheet piece among the raw material sheets.

9. The container production management system according to claim 8, wherein the raw material sheet is wound up into a roll-shaped original roll after processing in at least one processing process in which the raw material sheet is processed, the processing circuitry sets an original roll identifier for identifying the individual original roll, and the processing circuitry further links, in the database, the object identifier for the object with the original roll identifier for the original roll from which the raw material sheet is wound, the object being separated from the raw material sheet.

10. A container production management method, comprising:

adding an object identification code indicating an object identifier, which is information for identifying an object ranging from a material member for each container, to each of the objects;

reading the object identifier indicated by the object identification code added to each of the objects to be processed in at least one processing process of the object added with the object identification code;

reading the object identifier indicated by the object identification code added to each of reading the object identifier indicated by the object identification code added to each of the objects to be inspected in at least one inspection process of the object; and creating a database in which the object identifier indicated by the object identification code, information on at least one processing process, and inspection results in at least one inspection process are linked with each other, wherein, in adding the object identification code thereto, the object identification code is added to the material member for each container, or to a portion to be the material member among raw materials before the individual material member is separated therefrom, wherein the container production process is a resin container production process in which a resin container is produced as the container, wherein the object identification code is added to part of a region from an opening of a preform as the material member to a preform-shape remaining portion which is not deformed in a post-processing and immediately below a neck ring.

11. The container production management method according to claim 10, wherein each of the objects is processed in any one of a plurality of processing lanes in at least one processing process, the object identifier indicated by the object identification code added to each of the objects is read in each of the plurality of processing lanes, information on at least one processing process includes a lane identifier assigned to each of the plurality of processing lanes, and the object identifier of each of the objects is linked, in the database, with the lane identifier assigned to the lane in which each of the objects is processed.

12. The container production management method according to claim 10, wherein
each of the objects is processed in any one of a plurality of processors, or is conveyed by any one of a plurality of conveyers in at least one processing process,
the object identifier indicated by the object identification code added to each of the objects is read in each of the plurality of processors, or in each of the plurality of conveyers,
information on at least one processing process includes a device identifier assigned to each of the plurality of processors or each of the plurality of conveyers, and
the object identifier of each of the objects is linked, in the database, with the device identifier assigned to the processor in which each of the objects is processed, or the conveyers by which each of the objects is conveyed.

13. The container production management method according to claim 10, wherein
each of the preforms is molded by any one of a plurality of preform molds in a preform molding process,
a mold identifier is assigned to each of the plurality of preform molds, and
the object identifier of each of the preforms is further linked, in the database, with the mold identifier assigned to the preform mold with which each of the preforms is molded.

14. A container production management method comprising:
adding an object identification code indicating an object identifier, which is information for identifying an object ranging from a material member for each container, to each of the objects;
reading the object identifier indicated by the object identification code added to each of the objects to be processed in at least one processing process of the object added with the object identification code;
reading the object identifier indicated by the object identification code added to each of the objects to be inspected in at least one inspection process of the object; and
creating a database in which the object identifier indicated by the object identification code, information on at least one processing process, and inspection results in at least one inspection process are linked with each other,
wherein, in adding the object identification code thereto, the object identification code is added to the material member for each container, or to a portion to be the material member among raw materials before the individual material member is separated therefrom,
wherein the container production process is a can body production process in which a can body is produced as the container,
wherein the object identification code is added to the material member blanked from a sheet metal as the raw material, or to each of portions to be blanked as the material member among the sheet metals.

15. The container production management method according to claim 14, wherein
the can body is a two piece can, and
the object identification code is added to a portion to be a bottom part of the two piece can among the material members, or to each of portions to be blanked to be the bottom part of the two piece can among the sheet metals.

16. The container production management method according to claim 14, wherein
each of the material members is blanked from the sheet metal by any one of a plurality of blankers in a process in which the material member is blanked from the sheet metal,
a blanker identifier is assigned to each of the plurality of blankers, and
the object identifier of each of the objects is further linked, in the database, with the blanker identifier assigned to the blanker with which the material member of each of the objects is blanked.

17. A container production management method comprising:
adding an object identification code indicating an object identifier, which is information for identifying an object ranging from a material member for each container, to each of the objects;
reading the object identifier indicated by the object identification code added to each of the objects to be processed in at least one processing process of the object added with the object identification code;
reading the object identifier indicated by the object identification code added to each of reading the object identifier indicated by the object identification code added to each of the objects to be inspected in at least one inspection process of the object; and
creating a database in which the object identifier indicated by the object identification code, information on at least one processing process, and inspection results in at least one inspection process are linked with each other,
wherein, in adding the object identification code thereto, the object identification code is added to the material member for each container, or to a portion to be the material member among raw materials before the individual material member is separated therefrom,
wherein the container production process is a pouch production process in which a pouch container is produced as the container,
wherein the object identification code is added to a sheet piece as the material member to be separated from a raw material sheet as the raw material, or to a portion to be separated as the sheet piece among the raw material sheets.

18. The container production management method according to claim 17, wherein
the raw material sheet is wound up into a roll-shaped original roll after processing in at least one processing process in which the raw material sheet is processed,
an original roll identifier for identifying each of the original rolls is set, and
the object identifier for the object is further linked, in the database, with the original roll identifier for the original roll from which the raw material sheet is unwound, the object being separated from the raw material sheet.

* * * * *